Oct. 28, 1958   W. C. WOOTTON   2,858,156
SEALING BUSHING FOR A FASTENING DEVICE
Filed April 8, 1955   3 Sheets-Sheet 2
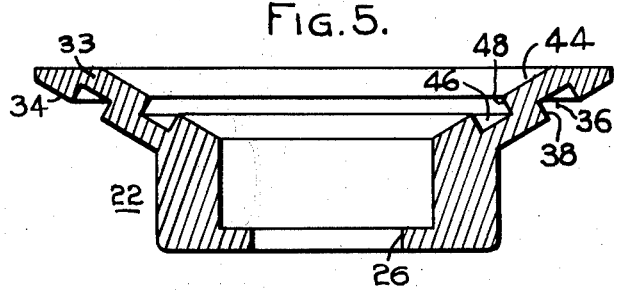
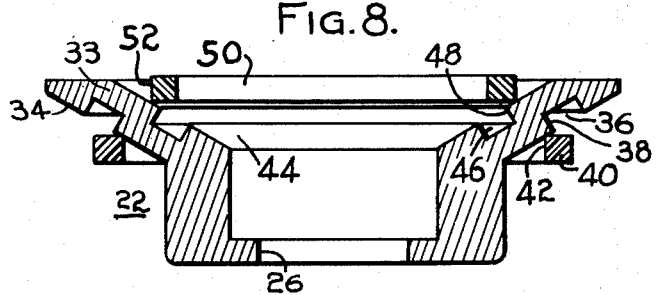
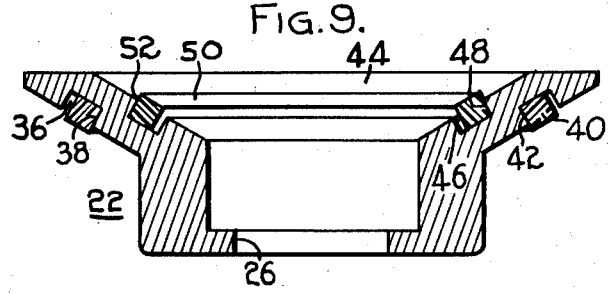
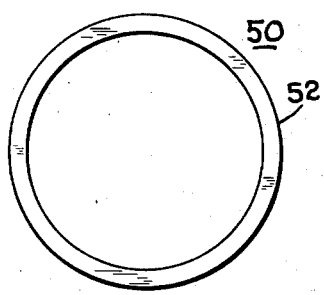
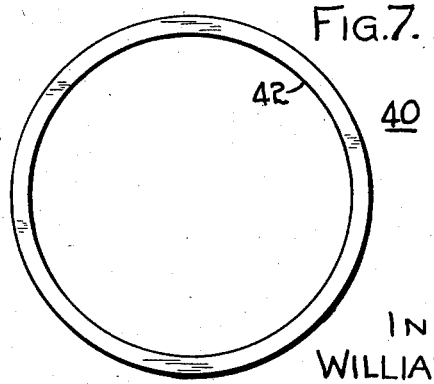
INVENTOR:
WILLIAM C. WOOTTON,
BY Robert E Ross
ATTORNEY.

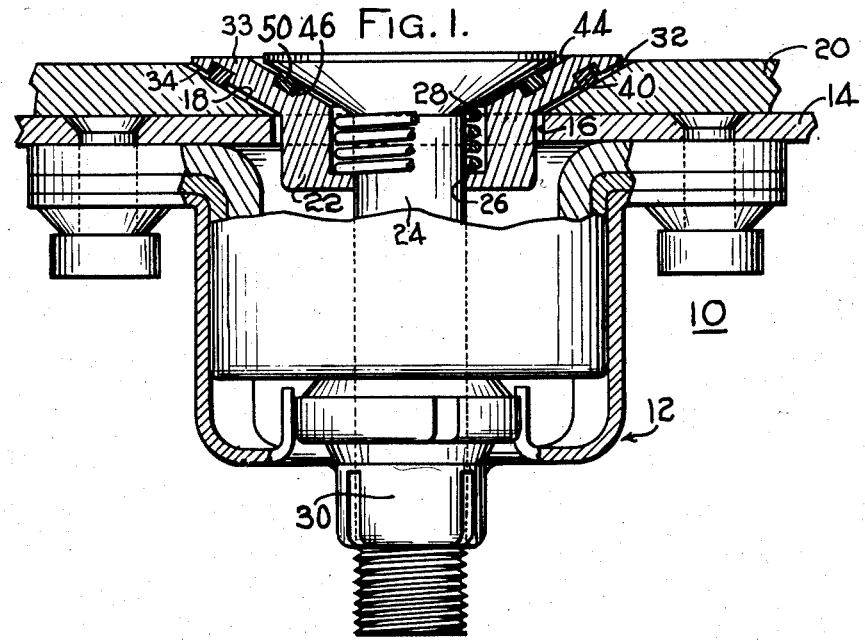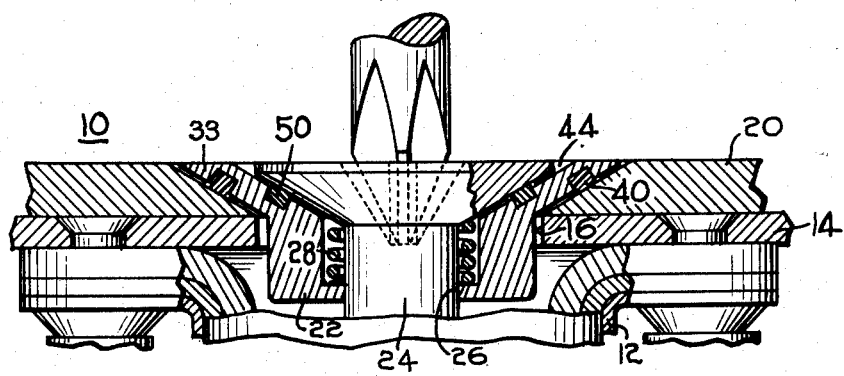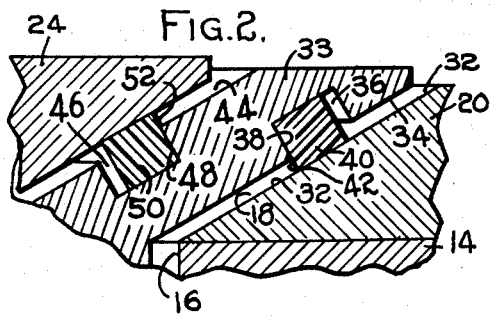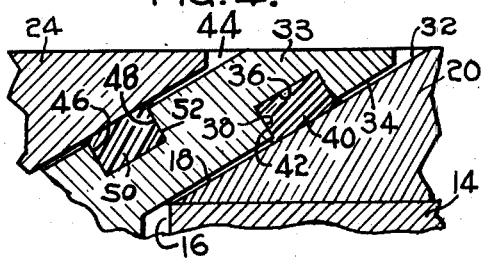

Oct. 28, 1958 W. C. WOOTTON 2,858,156
SEALING BUSHING FOR A FASTENING DEVICE
Filed April 8, 1955 3 Sheets-Sheet 3

INVENTOR:
WILLIAM C. WOOTTON,
BY Robert E Ross
ATTORNEY.

United States Patent Office 2,858,156
Patented Oct. 28, 1958

2,858,156

SEALING BUSHING FOR A FASTENING DEVICE

William C. Wootton, Centerville, Calif., assignor to United-Carr Fastener Corporation, Cambridge, Mass., a corporation of Delaware Application April 8, 1955, Serial No. 500,223

2 Claims. (Cl. 288—22)

This invention relates generally to fastening devices and has particular reference to a stud and bushing assembly for use in fastener assemblies of the type used for securing panels on an aircraft, commonly referred to as cowl fasteners.

In the construction of military and other types of aircraft, access openings must be provided in the fuselage and wings for servicing electronic devices and other equipment carried therein. The fasteners used for securing the panels closing said openings usually comprise a series of socket members mounted on the aircraft about the access aperture and a series of studs assembled in openings disposed in the panel for engagement with the sockets. The portions of the panel about each stud opening is usually dished inwardly providing a frusto-conical portion, and the head of each stud usually has an upwardly and outwardly inclined under surface providing a frusto-conical surface for seating in the frusto-conical opening. In some cases a bushing having a central aperture is provided to receive the stud with an external frusto-conical flange for seating against the frusto-conical portion, and the central aperture has an enlarged portion at one end for receiving the head of the stud.

Although such assemblies provided secure attachment, it has been found that they do not seal the stud opening tight enough to prevent dust and moisture from entering. A number of methods have been proposed for accomplishing such a seal; however, none have been entirely satisfactory in that they are too expensive, or are not adapted to ready replacement, or the seal could not withstand the combined twisting and compressive forces resulting from tightening the stud in the socket.

An object of this invention is to provide a sealing assembly in which a mating surface is provided with a groove and a sealing ring disposed in the groove and retained therein under circumferential stress.

A further object of the invention is to provide a sealing device for sealing a panel opening in which a sealing head having a frusto-conical surface is provided with a recess with a resilient sealing ring assembled therewith in such a manner as to be self-retaining.

A further object of the invention is to provide a cowl fastener stud having a head with a frusto-conical lower surface in which said lower surface has a circumferential recess and a sealing ring assembled therein and retained under circumferential tension against the inner wall of the recess.

Other objects of the invention will, in part, be obvious, and will, in part, appear hereinafter.

In the drawing:

Fig. 1 is a view in side elevation partly in section of a cowl fastener assembly embodying the sealing means described herein;

Fig. 2 is an enlarged view in section of a portion of the sealing means of Fig. 1;

Fig. 3 is a view of a portion of the assembly of Fig. 1 after the stud has been tightened into engagement with the socket;

Fig. 4 is a view similar to Fig. 2 after the stud has been tightened in the socket;

Fig. 5 is a view in section of the bushing used in the cowl fastener illustrated in Fig. 1 before assembly of the sealing rings therein;

Fig. 6 is a plan view of the upper or inner sealing ring;

Fig. 7 is a plan view of the lower or outer sealing ring;

Fig. 8 is a view in section similar to Fig. 5 showing the sealing rings in position for assembly;

Fig. 9 is a view of the bushing of Fig. 5 after the sealing rings have been assembled therein;

Figure 10:
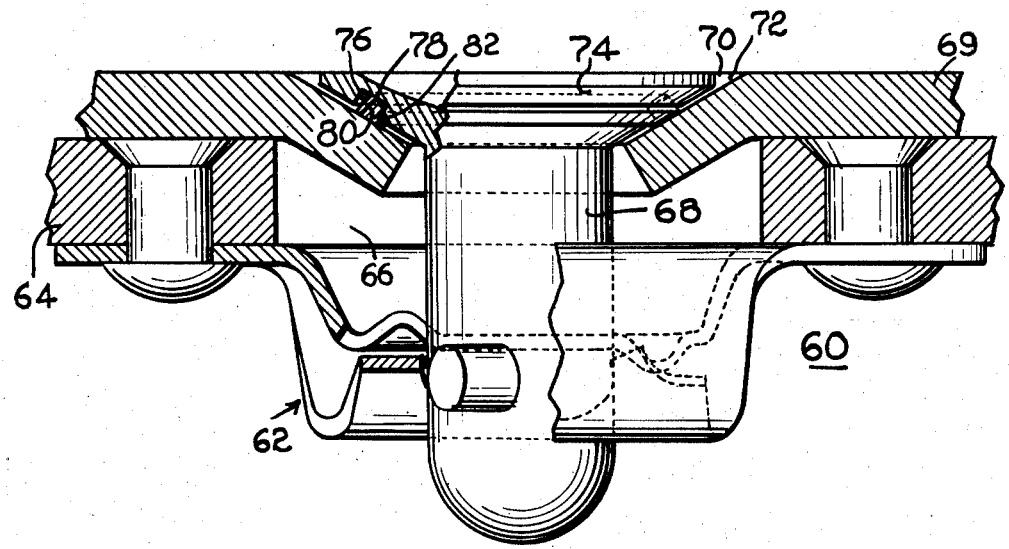
Fig. 10 is a view in elevation partly in section of a modified form of cowl fastener assembly embodying the features of the invention.

Referring to Figs. 1 through 9 of the drawing, there is illustrated a cowl fastener assembly 10 which comprises a socket assembly 12 secured to a lower panel 14 opposite an opening 16, and a stud assembly secured into an opening 18 in an upper panel 20 comprising a bushing 22 retained in the opening, a stud member 24 disposed in the central aperture 26 of the bushing, a biasing spring 28 assembled in the bushing under the head of the stud, and a socket-engaging nut 30 disposed in the end of the stud.

The particular cowl fastener assembly illustrated in Fig. 1 herein is described and claimed in Patent No. 2,640,244, issued June 2, 1953, to Philip D. Becker, and does not form a part of this application but is merely illustrative of a particular type of fastener which may utilize the teachings of the present invention.

To provide means for sealing the opening 18 in the panel 20 when the fastener parts are tightened together, the panel is provided with an inwardly dished frusto-conical portion 32 about the opening, and the bushing 22 is provided with a radial flange 33 having a frusto-conical lower surface 34. The surface 34 has a circumferential recess 36 formed therein which has an inner side wall 38 which is disposed generally perpendicular to the surface 34 and has a generally frusto-conical shape so that the diameter of the wall 38 is less at the bottom of the groove than at the entrance thereof. A sealing ring 40 is assembled into the recess 36, and in the preferred embodiment the ring is formed of resilient material such as a synthetic organic plastic of the polyamide type, commonly known as nylon, and has an inner surface 42 which is originally substantially cylindrical with a diameter preferably not greater than the diameter of the inner recess wall 35 at the bottom thereof. In the illustrated embodiment both the recess 36 and the ring 40 are rectangular in cross-section with the ring section having a thickness greater than the depth of the recess, and a width less than the width of the recess, with the total volume of the ring being greater than the volume of the recess for a purpose to appear hereinafter.

The ring 40 is assembled by stretching it to permit it to be disposed around the inner wall 38 of the recess, and when allowed to relax, the inner surface 42 of the ring grips the wall 38 tightly and conforms to the angle thereof, thereby tilting the outer edge of the ring upwardly into the recess. The gripping action of the ring on the frusto-conical wall 38 also tends to draw the ring deeper into the recess so that it bears against the bottom of the groove, thereby insuring that the ring is self-retaining in the recess.

To provide a seal between the bushing 22 and the head of the stud, the central aperture of the bushing is provided with a frusto-conical surface 44 at the upper end of the bushing with a circumferential recess 46 disposed therein having an outer side wall 48 which is disposed substantially perpendicular to the surface 44 so that the diameter of the wall 48 is greater at the bottom of the recess than at the entrance thereof. A resilient ring 50 is assembled into the recess 46, and in the illustrated embodiment the outer surface 52 of the ring is originally substantially cylindrical with a diameter preferably not greater than the diameter of the inner recess wall 35 at the bottom thereof. In the illustrated embodiment both the recess 36 and the ring 40 are rectangular in cross-section with the ring having a thickness greater than the depth of the recess, and a width less than the width of the recess, with the total volume of the ring being greater than the volume of the recess for a purpose to appear hereinafter.

The ring 50 is assembled into the recess 46 by compressing it circumferentially to enable it to enter the recess, and when allowed to relax, the outer surface 52 of the ring bears against the outer wall 48 of the recess and conforms to the angle thereof, tilting the inner edge of the ring downwardly into the recess. The expansive force of the ring against the frusto-conical outer wall of the recess tends to draw the ring downwardly into the recess so that it bears against the bottom thereof.

As illustrated in Fig. 4, when the stud is tightened in the socket, the rings 40 and 50 are squeezed so as to substantially fill the recesses; however, since each ring has a volume greater than the recesses in which it is disposed, a portion of the rings always remains outside the recess. With this structure the under surface of the head of the stud can never come in contact with the bushing, and the under surface of the bushing flange can never come in contact with the panel since the rings act as bearing surfaces and thereby prevent scoring of the metal surfaces during rotation of the stud and insures that a tight seal will be maintained between the various parts.

Referring now to Fig. 10 of the drawing, there is illustrated a cowl fastener assembly 60 which comprises a socket 62 mounted onto a panel 64 opposite an opening 66, and a stud 68 assembled into a panel 69 having an opening 70 with a peripheral inwardly dished surface 72. The stud 68 has a head with a lower surface 74 which is generally frusto-conical to conform to the shape of the inwardly dished portion of the panel and has a circumferential recess 76 formed therein with an inner wall 78 which is substantially perpendicular to the surface 74. A sealing ring 80 having an inner surface 82 which is originally cylindrical is assembled into the recess 76 so as to grip the wall 18 and tilt the outer edge of the ring upwardly in the manner described hereinbefore in connection with the recess 36 and ring 40 of the device shown in Fig. 1 of the drawing.

The relative dimensions of the ring and recess are as previously described so that when the stud 68 is engaged with the socket 62 the ring 80 bears against the panel surface 72 preventing contact between the head of the stud and the panel and providing a watertight seal about the stud opening.

Figure 11:
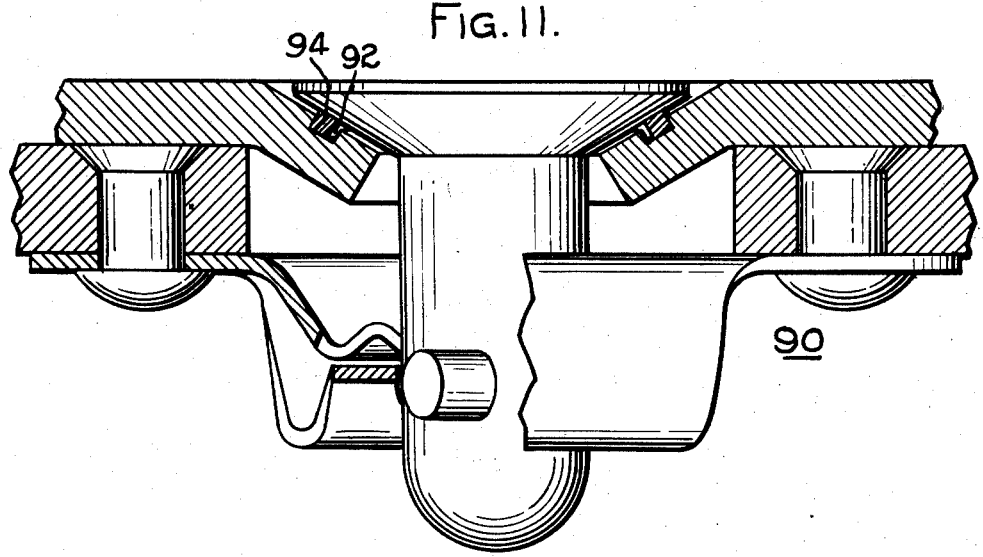
Fig. 11 is a view in elevation partly in section of a second modified form of cowl fastener assembly embodying the features of the invention.

Referring now to Fig. 11, there is illustrated a cowl fastener assembly 90 which is similar to that shown in Fig. 10 with the exception that a recess 92 is provided in the inwardly dished surface of the panel to receive a sealing ring 94 with the recess and sealing ring being of such size and shape to enable them to be assembled in the manner described hereinbefore in connection with the recess 46 and ring 50 of the assembly of Fig. 1 so that the ring is retained in the panel recess under circumferential compression and seals the panel opening and prevents contact between the head of the stud and the panel when the stud is engaged with the socket.

Although in the preferred embodiment of the invention the sealing rings are formed of nylon, other materials may be used provided they have the necessary resiliency, toughness, and surface properties.

Since certain other obvious modifications may be made in the scope of this invention, it is intended that all matter contained herein be interpreted in an illustrative and not in a limiting sense.

I claim:

1. A sealing bushing for securing a fastener stud to a panel through an opening therein, said bushing having an opening extending therethrough with an enlarged frusto-conical portion at one end with an interior circumferential recess formed in the surface thereof, said bushing having a radial flange with a frusto-conical surface having an exterior circumferential recess formed therein and a resilient sealing ring assembled into each recess, the sealing ring in said interior recess being originally of greater circumference than said interior recess and being maintained therein under circumferential compression bearing against the outer wall thereof, the sealing ring in said exterior recess being originally of lesser diameter than said exterior recess and being maintained therein under circumferential tension and bearing against the inner wall thereof.

2. A sealing bushing as set forth in claim 1 in which the outer wall of the interior recess and the inner wall of the exterior recess are each generally frusto-conical and disposed perpendicular to the surfaces from which they extend, the inner surface of the sealing ring in the outer recess and the outer surface of the sealing ring in the inner recess are originally cylindrical whereby each of said ring surfaces conforms to the angle of the recess surface against which it is disposed.

References Cited in the file of this patent

UNITED STATES PATENTS

| | | |
|---|---|---|
| 107,841 | Whipple | Sept. 27, 1870 |
| 1,111,319 | Paulsmeier | Sept. 22, 1914 |
| 2,216,505 | Thornhill | Oct. 1, 1940 |
| 2,578,389 | Andersson | Dec. 11, 1951 |
| 2,640,244 | Becker | June 2, 1953 |
| 2,647,778 | Shields | Aug. 4, 1953 |